(12) United States Patent
Wu

(10) Patent No.: US 7,721,287 B2
(45) Date of Patent: *May 18, 2010

(54) ORGANIZING TRANSMISSION OF REPOSITORY DATA

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 1093 days.

This patent is subject to a terminal disclaimer.

(21) Appl. No.: 10/930,697

(22) Filed: Aug. 31, 2004

(65) Prior Publication Data

US 2006/0048154 A1 Mar. 2, 2006

(51) Int. Cl.
G06F 9/46 (2006.01)
G06F 15/16 (2006.01)
G06F 17/30 (2006.01)
G08C 15/00 (2006.01)

(52) U.S. Cl. .............. 718/101; 718/100; 718/105; 370/230; 370/235; 709/201; 709/217; 707/643; 707/705; 707/713; 707/736; 707/769; 707/781

(58) Field of Classification Search .............. 718/101, 718/102, 103, 104, 105, 1, 100, 140, 150, 718/106, 107, 108; 706/46, 47, 50, 59, 61; 370/229, 230, 232, 235; 709/201, 202, 203, 709/217; 707/1, 2, 3, 8, 643, 673, 705, 706, 707/713, 711, 715, 736, 769, 770, 781, 812
See application file for complete search history.

(56) References Cited

U.S. PATENT DOCUMENTS

| | | | | |
|---|---|---|---|---|
| 5,995,955 | A * | 11/1999 | Oatman et al. | 706/50 |
| 6,178,459 | B1 * | 1/2001 | Sugiyama | 709/238 |
| 6,279,117 | B1 | 8/2001 | Takeda | |
| 6,353,844 | B1 * | 3/2002 | Bitar et al. | 718/102 |
| 6,560,501 | B1 * | 5/2003 | Walser et al. | 700/99 |
| 6,587,847 | B1 * | 7/2003 | Stier et al. | 706/50 |
| 6,636,868 | B1 * | 10/2003 | Bauer et al. | 707/104.1 |
| 6,805,502 | B2 | 10/2004 | Rai et al. | |

(Continued)

OTHER PUBLICATIONS

Pablo Rodriguez, Ernst W. Bierack; Dynamic Parallel access to replicated Content in the Internet; Aug. 4, 2002 IEEE.*

(Continued)

Primary Examiner—Meng-Ai An
Assistant Examiner—Abdullah Al Kawsar
(74) Attorney, Agent, or Firm—Mintz, Levin, Cohn, Ferris, Glovsky and Popeo, P.C.

(57) ABSTRACT

A method of organizing a transmission of repository data includes receiving, in a computer system, a request to transmit data from a data repository to a data recipient, the data to be transmitted by executing batch jobs that each identify a data amount to be transmitted to the data recipient. Control parameters are individually assigned to each of the batch jobs. Upon detecting during transmission that a performance parameter of the computer system does not meet a predefined standard, the data amount identified by at least one of the batch jobs is automatically changed in accordance with the control parameter assigned to the at least one of the batch jobs. An optimizer may determine the control parameters by solving a constraint optimization problem. The optimizer may take into account system characteristics such as priorities, transmission constraints or the volume of the data to be transmitted.

29 Claims, 5 Drawing Sheets

U.S. PATENT DOCUMENTS

| | | | |
|---|---|---|---|
| 6,944,862 | B2 | 9/2005 | Caggese et al. |
| 6,957,205 | B1 * | 10/2005 | Liongosari et al. ............. 706/45 |
| 7,020,876 | B1 * | 3/2006 | Deitz et al. ................. 718/100 |
| 7,137,116 | B2 | 11/2006 | Parkes et al. |
| 7,353,227 | B2 * | 4/2008 | Wu ............................... 707/8 |
| 2002/0012332 | A1 * | 1/2002 | Tiedemann et al. ......... 370/335 |
| 2002/0124756 | A1 | 9/2002 | Rai et al. |
| 2002/0147515 | A1 | 10/2002 | Fava et al. |
| 2003/0007466 | A1 * | 1/2003 | Chen ........................... 370/328 |
| 2003/0065648 | A1 | 4/2003 | Driesch et al. |
| 2003/0149747 | A1 * | 8/2003 | Rai et al. .................... 709/219 |
| 2004/0030677 | A1 | 2/2004 | Young-Lai |
| 2004/0083194 | A1 * | 4/2004 | Wu et al. ....................... 706/45 |
| 2004/0193827 | A1 * | 9/2004 | Mogi et al. ................. 711/170 |
| 2004/0208124 | A1 * | 10/2004 | Ogilvie ....................... 370/235 |
| 2004/0237087 | A1 | 11/2004 | Ye et al. |
| 2005/0157756 | A1 * | 7/2005 | Ormond ..................... 370/474 |
| 2005/0192991 | A1 | 9/2005 | Nomoto et al. |
| 2005/0198636 | A1 * | 9/2005 | Barsness et al. ............. 718/100 |
| 2005/0256826 | A1 * | 11/2005 | Hambrick et al. .............. 707/1 |
| 2007/0078117 | A1 * | 4/2007 | Hoffman et al. ............ 514/177 |

OTHER PUBLICATIONS

Rama Akkiraju, Pinar Keskinocak, Sesh Murthy and Frederick Wu; An Agent-Based Approach for Scheduling Multiple Machines; 2001 Kluwer Academic Publishers; Applied Intelligence 14, pp. 135-144.*

"Knowledge Repository for Software Agent Framework", by Yuh-Cherng Wu, dated Apr. 9, 2002, 35 pages.

"Compilation Service", Release 3.1 by Huiling Gong, undated, 14 pages.

"Compilation Service", Release 4.0, by Huling Gong, dated Dec. 16, 2002, 16 pages.

"BNALib, A Visual Basic Numerical Analysis Library for Personal Computers", downloaded from http://mathforum.org/library/view/3186.html on Aug. 3, 2004, 1 page.

"NMS-Numerical Analysis Library", downloaded from http://www.psu.edu/~burkardt/src/nms/nms.html on Aug. 3, 2004, 5 pages.

"Bulk Data Transfer Tools" by Tim Aldye, dated Apr. 2, 2001, 15 pages.

"The Authors Catalogue Their Documents for a Light Web Indexing" by Davide Musella, downloaded from http://www.isoc.org/inet96/proceedings/a2_4.htm on Mar. 29, 2004, 11 pages.

"Office WareHouse" advertising brochure, undated, 2 pages.

"Magnum eFILER™", downloaded from http://www.idt-inc.com/company_magnum_efilter.shtml on Apr. 21, 2004, 3 pages.

"Onbase Indexing Instructions", downloaded from http://www.fms.indiana.edu/ap/online_index.asp on Apr. 21, 2004, 5 pages.

"Advanced Database Indexing" by Yannis Manolopoulos, copyright 2000, Chapters 10-11, pp. 209-234.

"Selected Portions of File History of U.S. Appl. No. 10/930,722" retrieved from PAIR on Feb. 12, 2010.

* cited by examiner

ORGANIZING TRANSMISSION OF REPOSITORY DATA

TECHNICAL FIELD

This description relates to organizing a transmission of data from a repository.

BACKGROUND

Many computer systems use repositories for holding data that the system uses in its operations. In an enterprise resource planning system, the data may relate to the ongoing business operations performed in the system. Systems can have great volumes of data electronically stored in repositories, and this data can be updated at regular or arbitrary intervals.

In systems with great amounts of repository data, it becomes very important to provide adequate search functions for users to access the data. The system may include a search engine or equivalent providing search functionality for relevant documents according to a variety of criteria. A search engine typically has associated with it an index of repository contents. When a user enters a search query, the engine consults the index to determine whether there are any matches. In response, the search engine may send a "hit list" that enables the user to access any responsive data, for example in the form of a document. The process of creating the index based on the repository data is usually referred to as indexing.

When a new index is to be created, an initial indexing process is performed on the entire contents of one or more data repositories. In the case of a repository containing a large volume of data or from multiple distributed repositories, the indexing can take quite some time, up to a full day or more depending on system size. This may cause system resources to be unavailable or slow for a significant amount of time. Particularly, one bottleneck in this initial indexing process may be the step of transmitting the data from the repository to the service or equivalent that performs the indexing. It always takes a finite time to access one or more knowledge entities in the repository and to transmit the retrieved data to the indexing service. Moreover, the retrieval process may suffer from partially failed retrievals, for example when documents cannot be found where expected.

In existing systems, the transmission of repository data to a data recipient, such as an indexing service, may be performed in a sequential batch data retrieval process. Such a process is used in some products available from SAP AG in Walldorf (Baden), Germany. One disadvantage with this process is that it can be held up by a single batch of data that takes a long time to retrieve from the repository and/or to transmit to the indexing service. Such a delay means that it will occupy the system resource, and other indexes must wait longer until the index is finished, or in the case of an index being updated, that the content of the index will not be updated for a longer time. Moreover, such systems do not have a sophisticated solution for handling failed batch jobs efficiently.

If the indexing process takes a long time, this reduces system efficiency and delays the moment when the new index is ready to use. For this reason, indexing jobs that involve transmitting large amounts of data typically are run at times when system use is low, such as overnight or on weekends. In contrast, the process of later updating the index with changes in the repository data may take relatively less time, because it may be possible to focus the update indexing on only the knowledge entities that have changed since the index was created, a so-called delta update. Nevertheless, also this process can impact system performance if it involves a great volume of repository data, and the index content typically is not updated for search.

SUMMARY

The invention relates to organizing transmission of repository data.

In a first general aspect, a method comprises receiving, in a computer system, a request to transmit data from a data repository to a data recipient. The data is to be transmitted by executing batch jobs that each identify a data amount to be transmitted to the data recipient. Control parameters are individually assigned to each of the batch jobs. Upon detecting during transmission that a performance parameter of the computer system does not meet a predefined standard, the data amount identified by at least one of the batch jobs is automatically changed in accordance with the control parameter assigned to the at least one of the batch jobs.

In selected embodiments, automatically changing the data amount that is identified by at least one of the batch jobs comprises splitting the batch job into at least two batch jobs, or merging the batch job with another batch job.

The control parameter may specify that the at least one of the batch jobs can be divided into a number of batch subjobs. The control parameter may specify that the at least one of the batch jobs can be divided into a number of levels of batch subjobs. The control parameter may specify that the data amount identified by the at least one of the batch jobs can include a number of knowledge entities. The control parameter may specify a volume of the data amount identified by the at least one of the batch jobs. The control parameter may be a permitted range for the volume of the data amount. The control parameter may be the predefined standard.

In selected embodiments, assigning the control parameters comprises performing an optimization operation. The optimization operation may involve solving a constraint optimization problem.

In a second general aspect, a method comprises receiving, in a computer system, a request to transmit data from a data repository to a data recipient. Control parameters are individually assigned to a number of batch jobs for transmitting the data. Each of the batch jobs identifies a data amount that is to be transmitted to the data recipient. A performance parameter of the computer system is monitored while performing the batch jobs to determine whether the performance parameter does not meet a predefined standard. Upon detecting during transmission that the performance parameter does not meet the predefined standard, the control parameter of at least one of the batch jobs is evaluated to determine whether an additional batch job should be created. The additional batch job is created if the control parameter of the at least one of the batch jobs indicates that the additional batch job should be created.

Advantages of the systems and techniques described herein may include any or all of the following. Providing improved organization of a transmission of repository data. Providing an improved data transmission flexibility by individually assigning control parameters to batch jobs. Optimizing data transmission by taking into account relevant system characteristics. Providing an improved repository data transmission by dynamically changing the number of batch jobs being executed during the transmission.

The details of one or more embodiments of the invention are set forth in the accompanying drawings and the descrip-

BRIEF DESCRIPTION OF THE DRAWINGS

Like reference numerals in the various drawings indicate like elements.

DETAILED DESCRIPTION

Figure 1:
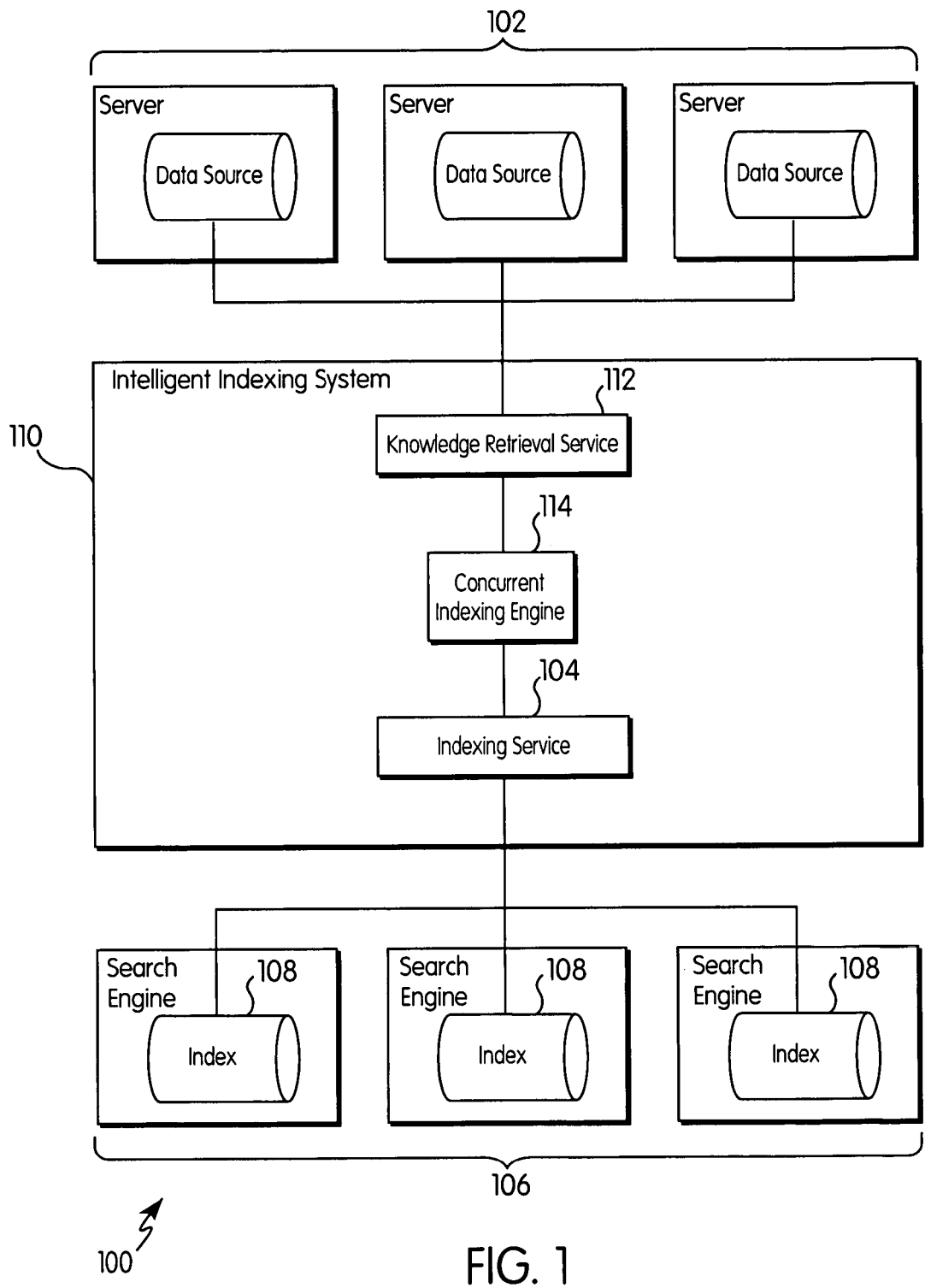
FIG. 1 is a block diagram of a system that organizes a transmission of repository data.

FIG. 1 is a block diagram of a system 100 that organizes a transmission of repository data from one or more data repositories 102 to a data recipient. Any or all of the data repositories may include a server device on which a data source is available. In this example, the data recipient is an indexing service 104 that will perform indexing for one or more search engines 106, each of which may have associated with it an index 108.

The data transmission may be initiated upon receiving a request from a user or from an automatically scheduled task. The indexing to be performed may be an initial indexing, meaning that the entire contents of one or more of the repositories 102 is being transferred. Another example is a periodic indexing wherein only the changed repository data is being transmitted. Yet another example is an automatic indexing when the original data are changed.

The indexing service 104 is here included in an intelligent indexing system 110 that communicates with the data repository 102 and the search engine 104. The intelligent indexing system 110 includes a knowledge retrieval service 112 that retrieves data from the repository 102. A concurrent indexing engine 114 creates batch jobs for transmitting the data, each of the batch jobs identifying a data amount that is to be transmitted to the recipient. When the concurrent indexing engine performs a batch job, it may trigger the knowledge retrieval service to retrieve the entire data amount that corresponds to the batch job. As another example, the concurrent indexing engine may successively trigger the knowledge retrieval service to retrieve portions of the batch job's data amount until the batch job is finished.

The data in the repository 102 may be of many different kinds. The data is embodied in at least one form, and this form is generally being referred to as a knowledge entity. Examples of knowledge entities include business transaction data, accounting records, business documents, sales orders, service orders, contact records, partner records or web pages. Other types of documents may be used. The transmission may involve knowledge entities that belong to a single or several different document types. Moreover, the same types of knowledge entities may be located in separate data repositories, such as when a multinational organization stores company records in several countries.

During transmission, the intelligent indexing system 110 monitors a performance parameter of the system 100. If the performance parameter does not meet a predefined standard during the transmission, the intelligent indexing system may evaluate whether to automatically change the data amount that is identified by at least one of the batch jobs. More than one performance parameter may be monitored simultaneously. Also, different performance parameters may be monitored in different situations. Particularly, processing times per knowledge entity for the batch jobs, the amount of data processed per unit of time, an average processing time for the complete index cycle from retrieval to index update, a request-response time of another business application or combinations thereof, are examples of performance parameters. When batch jobs are performed by successfully retrieving portions of the batch job's data amount from the data repository, the performance parameter may be evaluated in association with retrieving each such portion.

A change in the data amount identified by a batch job may involve splitting a batch job into two or more batch jobs executed in parallel. Generally, the system may be able to process the data amount more quickly if it is distributed among more batch jobs. For example, with more batch jobs the system can initiate several retrievals essentially simultaneously from the data repositories 102, as opposed to processing them consecutively in a single batch job. On the other hand, creating additional batch jobs may increase memory use in the system 100 and, if memory availability is low, the additional memory use may decrease the system's overall performance. Accordingly, before performing a split operation the intelligent indexing system 110 may determine whether the system 100 tolerates an increased memory use. For a distributed-repository case, another restriction, such as availability or maximal allowed data connections between the server and the external data repository, may be considered.

As another example, a change in batch job data amount may involve merging a batch job with at least another batch job. Generally, merging batch jobs may free up system resources such as memory for other purposes. Also, with fewer batch jobs in progress the system may be able to perform more processing that is unrelated to the indexing, such as processing for an application program with which a user is working. Accordingly, when a performance parameter does not meet a predefined standard, the intelligent indexing system 110 may perform a merger operation upon detecting that the system does not tolerate an increased memory use.

Thus, the system 100 transmits the data to the indexing service 104 by performing the batch jobs, and the data amounts identified by the respective batch jobs can be changed during the transmission. The indexing service parses through the received data and creates or updates the index 108. When the indexing is complete, the index is made available in the system so that the search engine(s) can perform searches on it.

Figure 2:
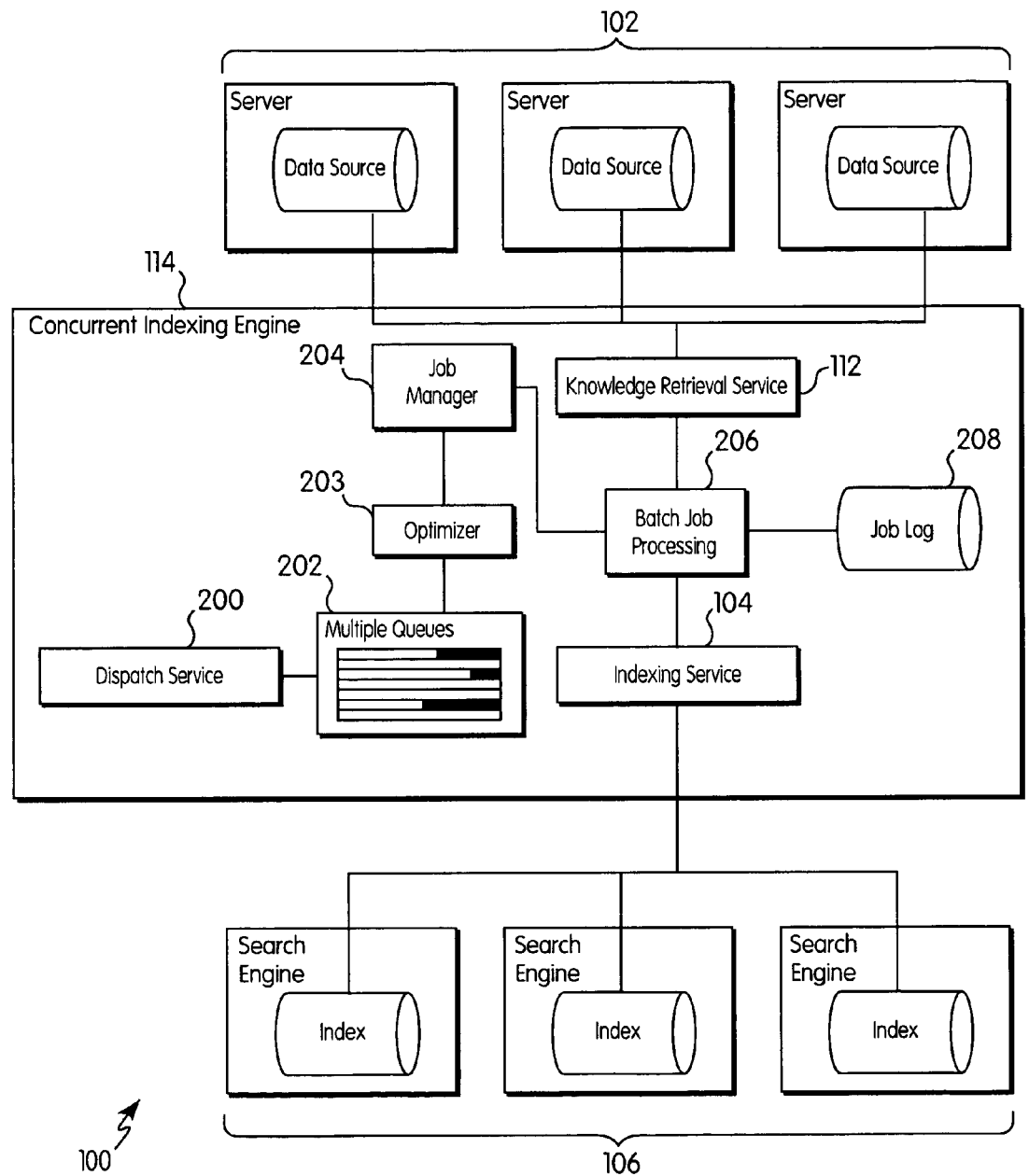
FIG. 2 is an example of components included in the system shown in FIG. 1.

FIG. 2 is a block diagram of components that can be included in the system 100, and particularly in the concurrent indexing engine 114. When the system receives a request to transmit data from the data repository 102 to the indexing service 104, the request is evaluated by a dispatch service 200 within the concurrent indexing engine. The dispatch service may determine a size of the data to be transmitted. This may be done by a programming call, for example by checking the size of a database table to determine how many knowledge entities are in the data load. The dispatch service creates a task for the requested transmission job and enters the task in one of multiple queues 202. The multiple queues may already contain one or more transmission job tasks. Particularly, the dispatch service may check whether the newly created task is dependent on a task that is already pending. For example, processing a clustering request before a delta update request, a fail-recovery request, or before deleting an index may not be efficient. Other examples of dependencies may involve having multiple same full-indexing requests or fail-recovery requests in the same queue. The dispatch service may automatically withdraw or rearrange requests based on a set of pre-defined business rules. Alternatively, the dispatch may provide a warning to a user and wait for the user's decision. The dispatch service can register a time stamp for the task. Such a time stamp can later be used in determining whether tasks are being promptly executed.

The multiple queues 202 provide parallel processing of transmission jobs. Each of the multiple queues may correspond to an index that is being updated or created. Different indexes can be created for different data repositories, such as for different servers in the data repositories 102. As another example, when a data repository includes knowledge entities of different languages, there may be created a separate index for each language. Thus, a transmission job may relate to more than one index.

An optimizer 203 scans the multiple queues 202 selects tasks that are at the front of their respective queues. Each of the tasks corresponds to a data transmission that is to be performed by executing batch jobs, and the optimizer will determine control parameters to be individually assigned to the batch jobs. The control parameters will determine whether the system during transmission should change the data amount identified by at least one of the batch jobs.

Determining the control parameters may involve the optimizer 203 performing an optimization operation. That is, the optimizer may calculate which control parameters to assign to the batch jobs so that the transmission is most efficient under current system characteristics. A system characteristic taken into account may include a priority of one or more of the batch jobs. For example, the batch job may be under a deadline to be performed by a predefined time. A system characteristic taken into account may include a constraint on the transmission. For example, there may be a limit on the maximum number of batch jobs to be performed, a maximum system load, and combinations of such constraints. A system characteristic taken into account may include a volume of the data to be transmitted.

The optimization operation may involve using a mathematical model to solve a constraint optimization problem. Essentially, the optimizer 203 may retrieve or otherwise receive information about the characteristics of the transmission, such as how much information is to be transmitted from what source to what recipient and when, including priorities and other constraints. Then, the optimizer, which may be provided with predefined algorithms or other mathematical tools, attempts to find a solution to the question of how to best organize the transmission job. Examples of the specifics that can be included in the solution are: the maximum number of subjobs; a maximum number of subjobs into which certain batch jobs can be divided; a maximum number of subjob levels into which certain batch jobs can be divided; and a threshold for initiating a change in the respective batch job. The optimizer can use standard tools, such as a numerical analysis library, in solving the constraint optimization problem. During transmission, the optimizer 203 can evaluate, based on measured system performance, whether there is another solution to the constraint optimization problem and assign new control parameters to one or more of the batch jobs.

A job manager 204 initiates the respective tasks. Upon selecting a task, the job manager creates batch jobs with the respective individually assigned control parameters determined by the optimizer 203 including, for example, the size of a data amount to be processed by each of the subjobs. Finally, the job manager initiates batch job processing 206 wherein the batch job(s) will be performed.

Figure 3:
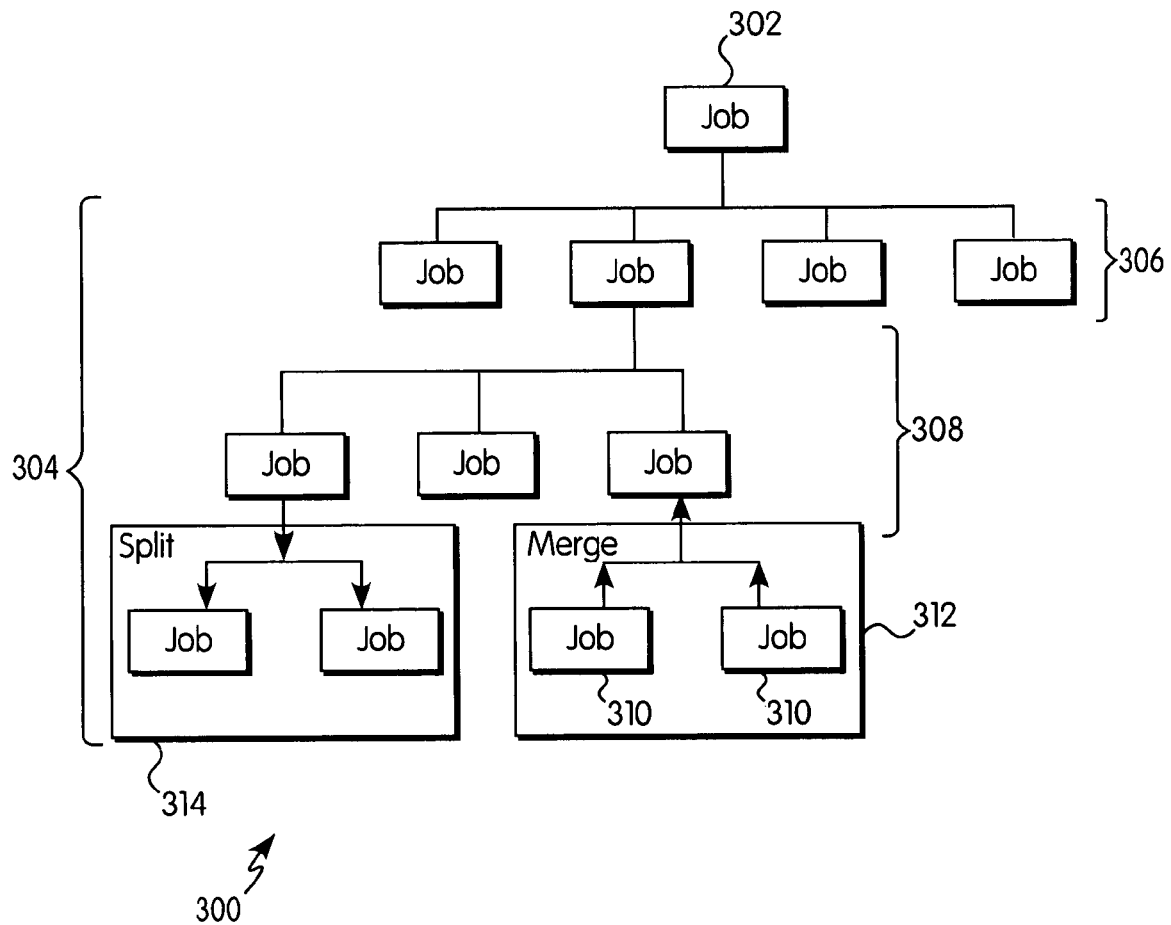
FIG. 3 schematically shows merging and splitting of batch jobs.

An example of the batch job processing 206 will be described with reference also to FIG. 3, which schematically shows batch jobs 300. The job manager 204 creates a first batch job 302 that corresponds to the entire transmission job and the first batch job is split into four subjobs, here first batch subjobs 306. A control parameter is individually assigned to each of the first batch subjobs. The splitting action changes the data amount directly handled by the first batch job by reducing it to zero. In contrast, each of the batch subjobs that are currently being performed identifies a portion of the first batch job's data amount. The system may log a time stamp upon initiating each of the first batch subjobs. Such a time stamp can be used in determining whether batch (sub)jobs are being promptly processed.

While processing the batch jobs, the system monitors a system performance parameter. If the parameter does not meet the predefined standard, the system may access the control parameter of at least one of the batch jobs to determine whether to make any changes. The system may then automatically change the data amount identified by at least one of the first batch subjobs 306 in accordance with its respective control parameter. For example, if the processing is less efficient than the predefined standard calls for, the system may seek to increase the number of batch jobs.

Here, the system splits one of the first subjobs 306 into three new subjobs. That is, the data amount identified by the one of the first subjobs 306 is divided among second batch subjobs 308. These subjobs will continue to be processed as are the remaining ones of the first batch subjobs 306. Accordingly, the system continues with retrieving the data identified by the subjobs from the data repository. The optimizer 203 assigns control parameter individually to the second batch subjobs. If the performance parameter does not meet the predefined standard, the system may change the data amount identified by any of the batch jobs in accordance with its control parameter.

Here, the system splits one of the second batch subjobs 308 into third batch subjobs 310, and thereafter again determines that the performance parameter does not meet the predefined standard. Upon accessing control parameter(s) to determine whether to change any data amount(s), the system can either perform a merge 312 of the third subjobs or a split 314 of another of the second batch subjobs.

The system may record events that occur during the transmission and that relate to the batch jobs. Such events can include the above described actions in the processing 206, including the detection of one or more instances where the performance parameter does not meet the predefined standard. Also, system status and performance measures may be recorded. For example, events can be recorded in a job log 208. The optimizer 203 may access the job log in determining the control parameters for the batch jobs.

Figure 4:
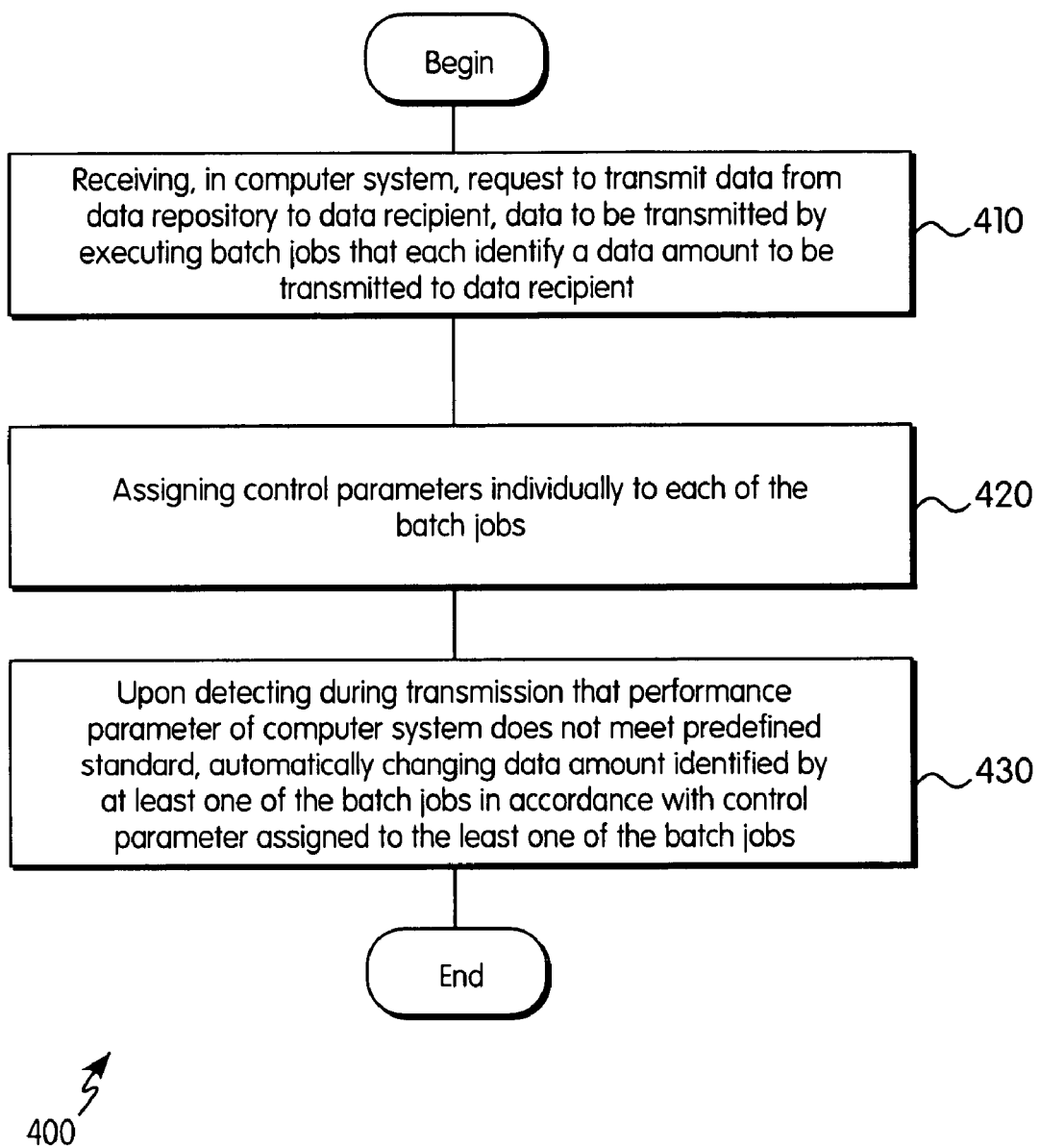
FIG. 4 is a flow chart of an embodiment of an inventive method.

FIG. 4 is a flow chart of a method 400 that can be performed in organizing a transmission of repository data. The method 400 may be performed in the system 100. For example, a computer program product may include instructions that cause a processor to perform operations comprising the steps of the method 400. As shown in FIG. 4, the method 400 includes the following steps:

Receiving, in a computer system, a request to transmit data from a data repository to a data recipient. The data is to be transmitted by executing batch jobs that each identify a data amount to be transmitted to the data recipient. For example, the system 100 may receive a transmission request from a user or through an automatic scheduling. The request may involve transmitting data from the repository 102 to the indexing service 104 for creating or updating one or more indices for the search engines 106.

Assigning, in step 420, control parameters individually to each of the batch jobs. For example, the intelligent indexing system 110 may be available for performing batch jobs using the concurrent indexing engine 114 that, in turn, may include the job manager 204 creating a batch job that is divided into subjobs in the batch job processing 206. The optimizer 203 may solve a constraint optimization problem to determine how to organize the transmission. The solution may specify the number of batch jobs to be used and the control parameters for each of them.

Upon detecting during transmission that a performance parameter of the computer system does not meet a predefined standard, automatically changing, in step 430, the data amount identified by at least one of the batch jobs in accordance with the control parameter assigned to the at least one of the batch jobs. For example, at least one of first subjobs 306 may be split into the second subjobs 308. As another example, the system may merge third subjobs 310.

Figure 5:
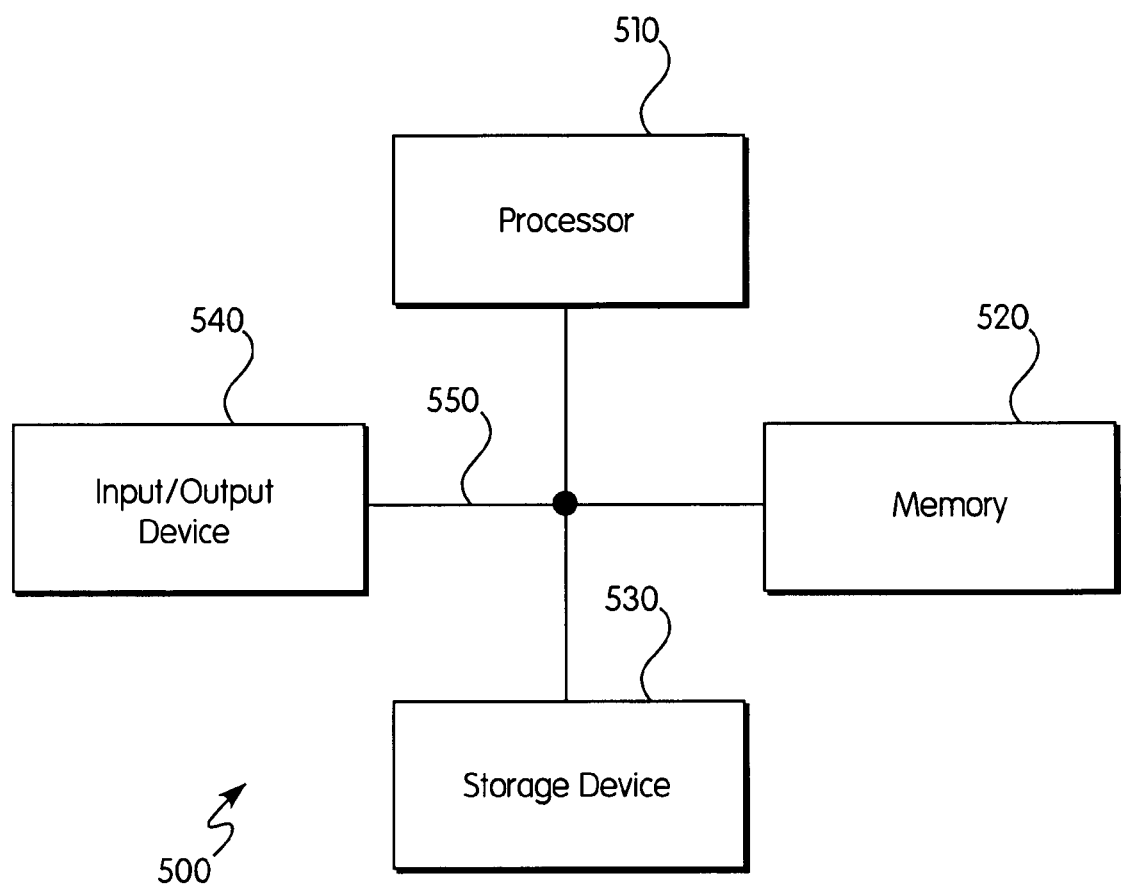
FIG. 5 is a block diagram of a general computer system.

FIG. 5 is a block diagram of a computer system 500 that can be used in the operations described above, according to one embodiment. For example, one or more systems 500 may be included in the system 100.

The system 500 includes a processor 510, a memory 520, a storage device 530 and an input/output device 540. Each of the components 510, 520, 530 and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of organizing a transmission of repository data, the method comprising:

receiving, in a computer system, a request to transmit data from a data repository to a data recipient, wherein the data is transmitted by concurrently executing a plurality of batch jobs that each identify a data amount to be transmitted to the data recipient, wherein the data amount is identified by a programming call by checking size of a database table to determine a number of knowledge entities are in the data amount to be transferred, the knowledge entities being at least two different document types selected from a group comprising: transaction data, accounting records, business documents, sales orders, service orders, contact records, web pages and other types of documents;

assigning control parameters individually to each of the batch jobs, the control parameters specifying an amount of data to be transferred by the corresponding batch job including a number of knowledge entities; and upon detecting during transmission that a performance parameter of the computer system does not meet a predefined standard, the performance parameter being affected by the execution of the batch jobs, automatically changing the data amount handled by at least one of the batch jobs by changing the control parameter assigned to the at least one of the batch jobs so that the performance parameter of the computer system meets the predefined standard, wherein the transmission is selected from a group comprising: an initial transfer of the data from the data repository, a periodic transfer of the data from the data repository, and combinations thereof; wherein the performance parameter is selected from a group comprising: processing times per knowledge entity for the batch jobs, how much of the data is processed per unit of time, an average processing time for a complete retrieval, a request-response time for another application in the computer system, and combinations thereof.

2. The method of claim 1, wherein automatically changing the data amount that is identified by the at least one of the batch jobs comprises splitting the at least one of the batch jobs into at least two batch jobs.

3. The method of claim 2, wherein the at least one of the batch jobs is split into the at least two batch jobs upon detecting that the computer system can support an increased system load.

4. The method of claim 1, wherein automatically changing the data amount that is identified by the at least one of the batch jobs comprises merging the at least one of the batch jobs with another of the batch jobs, the merged batch jobs being executed as a single batch job.

5. The method of claim 4, wherein the at least one of the batch jobs is merged with the other of the batch jobs upon detecting that memory usage by the computer system exceeds a predetermined level.

6. The method of claim 1, wherein performing at least one of the batch jobs comprises successively retrieving from the data repository portions of the data amount identified by the at least one of the batch jobs.

7. The method of claim 1, wherein the data is transmitted from several data repositories including the data repository.

8. The method of claim 1, wherein the data is transmitted to the data recipient for indexing.

9. The method of claim 8, wherein the indexing is for several search engines.

10. The method of claim 1, wherein the control parameter specifies that the at least one of the batch jobs can be divided into a number of batch subjobs.

11. The method of claim 10, wherein the control parameter is a permitted range for the number of batch subjobs.

12. The method of claim 1, wherein the control parameter specifies that the at least one of the batch jobs can be divided into a number of levels of batch subjobs.

13. The method of claim 12, wherein the control parameter is a permitted range for the number of levels of batch subjobs.

14. The method of claim 1, wherein the control parameter specifies that the data amount identified by the at least one of the batch jobs can include a number of knowledge entities.

15. The method of claim 14, wherein the control parameter is a permitted range for the number of knowledge entities.

16. The method of claim 1, wherein the control parameter specifies a volume of the data amount identified by the at least one of the batch jobs.

17. The method of claim 16, wherein the control parameter is a permitted range for the volume of the data amount.

18. The method of claim 1, wherein the control parameter is the predefined standard.

19. The method of claim 18, wherein the control parameter is a permitted range for the predefined standard.

20. The method of claim 1, wherein assigning the control parameters comprises performing an optimization operation.

21. The method of claim 20, wherein performing the optimization operation comprises determining the control parameters for the batch jobs while taking into account a priority of at least one of the batch jobs.

22. The method of claim 21, wherein the priority is that the at least one of the batch jobs must be performed by a predefined time.

23. The method of claim 20, wherein performing the optimization operation comprises determining the control parameters for the batch jobs while taking into account a constraint on the transmission.

24. The method of claim 23, wherein the constraint is selected from the group consisting of: a maximal number of batch jobs, a maximum system load, and combinations thereof.

25. The method of claim 20, wherein performing the optimization operation comprises determining the control parameters for the batch jobs while taking into account a volume of the data to be transmitted.

26. A computer program product embodied in a storage medium for storing the computer program product, the computer program product including instructions that, when executed, cause a processor to perform operations comprising receive, in a computer system, a request to transmit data from a data repository to a data recipient, wherein the data is transmitted by concurrently executing a plurality of batch jobs that each identify a data amount to be transmitted to the data recipient, wherein the data amount is identified by a programming call by checking size of a database table to determine a number of knowledge entities are in the data amount to be transferred, the knowledge entities being at least two different document types selected from a group comprising: transaction data, accounting records, business documents, sales orders, service orders, contact records, web pages and other types of documents;

assign control parameters individually to each of the batch jobs, the control parameters specifying an amount of data to be transferred by the corresponding batch job including a number of knowledge entities; and upon detecting during transmission that a performance parameter of the computer system does not meet a predefined standard, the performance parameter being affected by the execution of the batch jobs, automatically change the data amount handled by at least one of the batch jobs by changing the control parameter assigned to the at least one of the batch jobs so that the performance parameter of the computer system meets the predefined standard; wherein the transmission is selected from a group comprising: an initial transfer of the data from the data repository, a periodic transfer of the data from the data repository, and combinations thereof; wherein the performance parameter is selected from a group comprising: processing times per knowledge entity for the batch jobs, how much of the data is processed per unit of time, an average processing time for a complete retrieval, a request-response time for another application in the computer system, and combinations thereof.

27. A method of organizing a transmission of repository data, the method comprising:

receiving, in a computer system, a request to transmit data from a data repository to a data recipient, wherein the data amount is identified by a programming call by checking size of a database table to determine a number of knowledge entities are in the data to be transferred, the knowledge entities being at least two different document types selected from a group comprising: transaction data, accounting records, business documents, sales orders, service orders, contact records, web pages and other types of documents;

assigning control parameters individually to a number of batch jobs for concurrently transmitting the data, the control parameters specifying an amount of data to be transferred by the corresponding batch job including a number of knowledge entities;

monitoring a performance parameter of the computer system while performing the batch jobs to determine whether the performance parameter does not meet a predefined standard, the performance parameter being affected by the execution of the batch jobs;

upon detecting during transmission that the performance parameter does not meet the predefined standard, evaluating the control parameter of at least one of the batch jobs to determine whether an additional batch job should be created; and creating the additional batch job if the control parameter of the at least one of the batch jobs indicates that the additional batch job should be created so that the performance parameter of the computer system meets the predefined standard, the additional batch job being assigned a control parameter so that the performance parameter of the computer system meets the predefined standard; wherein the transmission is selected from a group comprising: an initial transfer of the data from the data repository, a periodic transfer of the data from the data repository, and combinations thereof; wherein the performance parameter is selected from a group comprising: processing times per knowledge entity for the batch jobs, how much of the data is processed per unit of time, an average processing time for a complete retrieval, a request-response time for another application in the computer system, and combinations thereof.

28. The method of claim 27, wherein the control parameter indicates that the at least one of the batch jobs should be merged with another of the batch jobs, further comprising performing the merger.

29. A computer program product embodied in a storage medium for storing the computer program product, the computer program product including instructions that, when executed, cause a processor to perform operations comprising:

receive, in a computer system, a request to transmit data from a data repository to a data recipient, wherein the data amount is identified by a programming call by checking size of a database table to determine a number of knowledge entities are in the data to be transferred, the knowledge entities being at least two different document types selected from a group comprising: transaction data, accounting records, business documents, sales orders, service orders, contact records, web pages and other types of documents;

assign control parameters individually to a number of batch jobs for concurrently transmitting the data, the control parameters specifying an amount of data to be transferred by the corresponding batch job including a number of knowledge entities;

monitor a performance parameter of the computer system while performing the batch jobs to determine whether the performance parameter does not meet a predefined standard, the performance parameter being affected by the execution of the batch jobs;

upon detecting during transmission that the performance parameter does not meet the predefined standard, evaluate the control parameter of at least one of the batch jobs to determine whether an additional batch job should be created; and create the additional batch job if the control parameter of the at least one of the batch jobs indicates that the additional batch job should be created so that the performance parameter of the computer system meets the predefined standard, the additional batch job being assigned a control parameter so that the performance parameter of the computer system meets the predefined standard; wherein the transmission is selected from a group comprising: an initial transfer of the data from the data repository, a periodic transfer of the data from the data repository, and combinations thereof; wherein the performance parameter is selected from a group comprising: processing times per knowledge entity for the batch jobs, how much of the data is processed per unit of time, an average processing time for a complete retrieval, a request-response time for another application in the computer system, and combinations thereof.

* * * * *